(12) United States Patent
Poussin et al.

(10) Patent No.: US 8,416,151 B2
(45) Date of Patent: Apr. 9, 2013

(54) SET OF EQUIPMENT FOR AN AIRCRAFT INCLUDING A VIDEO SENSOR AND AT LEAST TWO HEAD-UP DISPLAY DEVICES AND A PROCESSOR FOR ALLEVIATING ALIGNMENT DISCREPANCIES FOR THE AT LEAST TWO HEAD-UP DISPLAY DEVICES

(75) Inventors: Sandra Poussin, Tournefeuille (FR); David Bideau, Toulouse (FR); Laurent Coloma, Toulouse (FR); Stephane Gauthier, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 258 days.

(21) Appl. No.: 12/706,352

(22) Filed: Feb. 16, 2010

(65) Prior Publication Data

US 2010/0265162 A1    Oct. 21, 2010

(30) Foreign Application Priority Data

Feb. 16, 2009    (FR) ...................... 09 51000

(51) Int. Cl.
*G09G 5/00*    (2006.01)
*G06K 9/40*    (2006.01)
*G06K 9/36*    (2006.01)
(52) U.S. Cl. ................. 345/7; 345/9; 382/254; 382/276
(58) Field of Classification Search .................. 345/7–9; 382/254–308
See application file for complete search history.

(56) References Cited

U.S. PATENT DOCUMENTS

| 3,610,825 A | 10/1971 | Fritzel |
| 5,220,426 A | 6/1993 | Karlock |
| 2010/0014770 A1* | 1/2010 | Huggett et al. ............... 382/260 |
| 2010/0054545 A1* | 3/2010 | Elliott ........................... 382/115 |

FOREIGN PATENT DOCUMENTS

| EP | 0 210 088 A1 | 1/1987 |
| EP | 0210088 A1 * | 1/1987 |
| EP | 1 699 237 A1 | 9/2006 |

OTHER PUBLICATIONS

Bruce A. Reichlen, "Sparcchair: A One Hundred Million Pixel Display", Virtual Reality Annual International Symposium, IEEE, XP010130478, May 28, 1993, pp. 300-307.

* cited by examiner

*Primary Examiner* — Bipin Shalwala
*Assistant Examiner* — Ryan A Lubit
(74) *Attorney, Agent, or Firm* — Oblon, Spivak, McClelland, Maier & Neustadt, L.L.P.

(57) ABSTRACT

A set of equipment items for an aircraft including a video transducer and at least two head-up display devices, wherein the video transducer and/or each HUD device is/are capable of defining the image to be projected by the HUD device on the basis of the display field of the HUD device and of one or more HUD/transducer errors, each HUD/transducer error being defined as being the difference between the HUD error of the corresponding HUD support around a direction and the transducer error around this same direction, the HUD error of an HUD support around a direction being the angular difference around this direction between the line of sight of the HUD support and a measuring reference line, and the transducer error around a direction being the angular difference around this direction between the line of sight of the transducer support and a measuring reference line.

14 Claims, 4 Drawing Sheets

SET OF EQUIPMENT FOR AN AIRCRAFT INCLUDING A VIDEO SENSOR AND AT LEAST TWO HEAD-UP DISPLAY DEVICES AND A PROCESSOR FOR ALLEVIATING ALIGNMENT DISCREPANCIES FOR THE AT LEAST TWO HEAD-UP DISPLAY DEVICES

BACKGROUND OF THE INVENTION

The present invention relates to a set of equipment items for an aircraft comprising a video transducer and at least two head-up display devices—known as HUD devices—one of the HUD devices being intended for the pilot, the other HUD device being intended for the copilot of the aircraft. The invention also relates to an electronic compensation method making it possible, for each HUD device, to alleviate a discrepancy of conformity between a projected image formed from a video image captured by the video transducer and an external scene ahead of the aircraft.

It is known to use a video transducer to capture an image of the external environment ahead of an aircraft for the purpose of improving the perception of this environment by the pilot ("situation awareness"). The image delivered by the video transducer is projected focused at infinity by the HUD device—generally onto a transparent screen—in such a way that it is superposed on the external scene viewed by the pilot through this screen. Any offset between the projected image and the external scene or between the projected image and the symbology generated and projected onto the screen by the HUD device has the effect of hampering the pilot's perception instead of improving it.

According to the standards currently in force, the discrepancy of alignment between the line of sight of the HUD device, defined as being the axis passing through the theoretical eye of the pilot and the center of projection on the screen, and the line of sight of the video transducer, or in other words the optical axis of the said transducer, must not exceed 5 mrad. In addition, the resultant image projected by the HUD device and formed by the superposition of the video image transmitted by the video transducer and the symbology generated by the HUD device, must be in conformity with the external scene viewed by the pilot.

SUMMARY OF THE INVENTION

In the case that two HUD devices are provided, the line of sight of each HUD device must be aligned with that of the video transducer.

In view of the size of an aircraft and of the industrial scale of its production, it is impossible, by means of simple mechanical design, to satisfy the alignment requirements imposed by the standards. The impact of design and manufacturing tolerances is even more sensitive to the extent that the equipment items involved (video transducer and HUD devices) are installed on separate structural parts of the aircraft: each HUD device is mounted on a support installed in the cockpit, generally in the high part thereof, while the video transducer is mounted on a support fixed to an external portion of the structure of the nose cone of the aircraft, ahead of the cockpit. The tolerances of design, machining and assembly of structural elements of the aircraft and of the equipment supports, as well as the intrinsic errors of equipment items, lead to alignment discrepancies on the order of degrees between the diverse equipment items. It therefore appears necessary to correct these discrepancies by compensation, which for each combination of transducer and HUD device, can be achieved electronically and/or optically by one of the equipment items (HUD device or video transducer) or by both.

The invention aims to provide, for an aircraft, a method and a set of equipment items making it possible to display, simultaneously on at least two HUD devices, an image originating from a single video transducer, by optimizing the conformity between the image projected by each HUD device and the external scene ahead of the aircraft. In particular, the invention aims to provide a method and a set of equipment items making it possible to compensate electronically for the discrepancies of alignment between a video transducer and at least two HUD devices.

To date there is no known method or set of equipment items satisfying these objectives.

The invention also aims to achieve these objectives by limiting the calculating power of the equipment items (on-board and real-time), by using existing video formats and by optimizing the size and fineness of the images projected by the HUD devices.

Another objective of the invention is to provide a method and a set of equipment items whose employment does not lead to any impact on the burden of the pilot and of the copilot.

The invention aims to achieve all of the aforesaid objectives at less cost, without increase of weight of the aircraft and without substantial impact on the industrial operations of manufacture and customization of this aircraft.

To accomplish this, the invention proposes a set of equipment items for an aircraft comprising a video transducer and at least two head-up display devices, known as HUD devices. The video transducer has a line of sight and a field of vision defining a video image captured by the said video transducer. Each HUD device has a line of sight and a display field defining an image projected by the said HUD device. The video transducer is intended to be fixed on a support of an aircraft—known as transducer support—in a unique position, in such a way that the transducer support makes it possible to sight a line, known as line of sight of the transducer support, which, when a video transducer is fixed on the said support, coincides with the line of sight of the said video transducer. Each HUD device is intended to be fixed on a support of the aircraft—known as HUD support—in a unique position, in such a way that each HUD support makes it possible to sight a line, known as line of sight of the HUD support, which, when an HUD device is fixed on the said support, coincides with the line of sight of the said HUD device.

The set of equipment items according to the invention is characterized in that:
  the field of vision of the video transducer is at least equal to
    the meeting of the display fields of the HUD devices,
    augmented by a margin corresponding to the offsets of
    the field of vision of the video transducer and of the
    display fields of the HUD devices, which offsets may be
    generated when the set of equipment items is mounted in
    an aircraft, as a result of discrepancies of alignment
    between the lines of sight of the video transducer and
    HUD devices and a reference direction, known as aircraft
    line of sight, determined by the structure of the
    aircraft,
  the video transducer is adapted such that it can communicate
    with each HUD device and vice versa,
  at least one of the equipment items is adapted such that it
    can receive:
    at least one datum, known as transducer error, equal to
      the angular difference around a direction between the
      line of sight of the transducer support and a measuring
      reference line, as well as, for each HUD support, at least one datum, known as HUD error, equal to the angular difference around a direction between the line of sight of the said HUD support and a measuring reference line, and/or, for each HUD support, at least one datum, known as HUD/transducer error, equal to the difference between the HUD error of the said HUD support around a given direction and the transducer error around this same direction, for each HUD device, at least one among the video transducer and the said HUD device is capable of defining an image to be projected on the basis of the display field of the said HUD device and of one or more HUD/transducer errors, in such a way as to alleviate the discrepancies of alignment between the fields of vision and display of the video transducer and HUD device and the scene ahead of the aircraft.

It is to be noted that, throughout the description, the terms "display field" of an HUD device denote the operational display field of an HUD device, or in other words the part of the screen of the HUD device (whether this screen is a screen specific to the HUD device or is a portion of the glass canopy of the aircraft) which is actually used to display an image. This operational display field may be smaller than the optical display field of the HUD device, or in other words than its potential display field. In fact, it is known to perform a harmonization operation during installation of an HUD device making it possible to define a first electronic compensation to be applied to alleviate a discrepancy of alignment between the line of sight of the HUD device and the aircraft line of sight. This first compensation is manifested by an offset of the image projected into the optical display field of the HUD device, and it therefore defines an operational display field (or in other words an actually projected image size), which is smaller than the optical field of the HUD device.

Furthermore, the phrase "angular difference between two lines around a given direction" is understood as the angle between the projections of the said lines in a plane orthogonal to the said direction.

The communication between the video transducer and each HUD device may be achieved by a bidirectional bus pre-installed in the aircraft or by any appropriate wireless means. Furthermore, the errors received by one of the equipment items are preferably stored in at least one memory of the aircraft, with which the said equipment item communicates via a data bus pre-installed in the aircraft or supplied together with the set of equipment items, or via any appropriate wireless means.

Advantageously, at least one of the equipment items is adapted such that it can receive:

at least:
one error known as transversal transducer error, equal to the angular difference around a vertical direction of the aircraft (yaw direction) between the line of sight of the transducer support and a measuring reference line considered as being aligned with the aircraft line of sight, and one error, known as vertical transducer error, equal to the angular difference around a transversal direction of the aircraft (pitch direction) between the line of sight of the transducer support and a measuring reference line considered as being aligned with the aircraft line of sight, for each HUD support, one error, known as transversal HUD error, equal to the angular difference around the vertical direction of the aircraft between the line of sight of the said HUD support and a measuring reference line considered as being aligned with the aircraft line of sight, and one error, known as vertical HUD error, equal to the angular difference around the transversal direction of the aircraft between the line of sight of the said HUD support and a measuring reference line considered as being aligned with the aircraft line of sight, and possibly
one error, known as transducer error in roll, equal to the angular difference around a longitudinal direction of the aircraft (roll direction) between a line orthogonal to the line of sight of the transducer support and a measuring reference line considered as being orthogonal to the aircraft line of sight, for each HUD support, one error, known as HUD error in roll, equal to the angular difference around the longitudinal direction of the aircraft between a line orthogonal to the line of sight of the said HUD support and a measuring reference line considered as being orthogonal to the aircraft line of sight, and/or, for each HUD support, at least one transversal HUD/transducer error and one vertical HUD/transducer error and possibly one HUD/transducer error in roll.

In a first embodiment, for each HUD device, the video transducer is capable of transmitting to the HUD devices an image corresponding to a window over the captured image, which window is defined on the one hand by the smallest of the display fields of the HUD devices and on the other hand by an average, for each direction, of the HUD/transducer errors of the HUD supports around the said direction. The image to be projected by each HUD device corresponds to the image transmitted by the video transducer. It nevertheless is to be noted that, even though an HUD device possesses a display field larger than the image transmitted by the video transducer, the image to be projected thereby is the meeting of the transmitted image centered on the display field of the said HUD device and a dark margin completing this image over the entirety of the said display field.

In a second and a third embodiment, for each HUD device, the image to be projected corresponds to a window over the captured image defined by the display field of the said HUD device and by each HUD/transducer error of the corresponding HUD support.

In the second embodiment, the video transducer possesses two video circuits and is capable, for each HUD device, of defining and transmitting, to the said HUD device, the image to be projected thereby.

In the third embodiment, the video transducer and each HUD device are respectively adapted for transmitting and receiving the image captured by the video transducer, and each HUD device is capable of defining its image to be projected.

In a fourth and fifth embodiment, the video transducer is capable of defining an image, known as transmitted image, corresponding to a window over the captured image, which window is defined on the one hand by the smallest of the display fields of the HUD devices and on the other hand by an average, for each direction, of the HUD/transducer errors of the HUD supports around the said direction.

Furthermore, in the fourth embodiment, each HUD device is capable of defining its image to be projected as being the meeting on the one hand of the intersection between the transmitted image and a window over the captured image, which window is defined by the display field of the said HUD device and by each HUD/transducer error of the corresponding HUD support, and on the other hand of a dark margin completing this intersection over the entirety of the display field of the said HUD device.

In the fifth embodiment, each HUD device is capable of defining its image to be projected as being the meeting on the one hand of the transmitted image offset as a function, for each direction, of the difference between the average calculated by the video transducer (for this direction) and the HUD/transducer error (around this direction) of the corresponding HUD support, and on the other hand of a dark margin completing the image offset in this way over the entirety of the display field of the said HUD device.

It is to be noted that a transversal HUD/transducer error results in a translational offset of the image in the transversal direction; a vertical HUD/transducer error results in a translational offset of the image in the vertical direction; an HUD/transducer error in roll results in a rotational offset of the image in the display field of the HUD device.

Advantageously, each HUD device is capable of generating and transmitting, to the video transducer, a datum representative of a "video displayed" state when it projects a video image. Furthermore, the video transducer is capable:

of functioning according to the first or the fourth or the fifth embodiment of the invention when it receives the datum representative of the "video displayed" state from at least two HUD devices, and on this occasion of transmitting, to at least these HUD devices, a datum representative of a "multiple display" mode of functioning, when it receives the datum representative of the "video displayed" state from only a single HUD device, of transmitting, to at least this HUD device, a datum representative of a "single display" mode of functioning, and of defining and transmitting, to the other HUD device, an image corresponding to a window over the captured image, which window is defined by the display field of this HUD device and by each HUD/transducer error of the corresponding HUD support, the image to be projected by this HUD device being the image transmitted in this way by the video transducer.

The invention extends to an aircraft, characterized in that it comprises a set of equipment items according to the invention, a transducer support, HUD supports and at least one memory in which each transducer error and each HUD error and/or each HUD/transducer error are stored.

The invention also extends to a method employed by a set of equipment items according to the invention mounted in an aircraft. In particular, the invention relates to a method for electronic compensation between a video transducer and at least two HUD devices of an aircraft, making it possible to alleviate for each HUD device, a discrepancy of conformity between an external scene ahead of the aircraft and an image projected by the said HUD device, formed on the basis of a video image captured by the video transducer. As defined in the foregoing, the video transducer has a line of sight and a field of vision defining the video image captured by the said video transducer; each HUD device has a line of sight and a display field defining the image projected by the said HUD device; the video transducer is fixed on a transducer support making it possible to sight a line, known as line of sight of the transducer support, which coincides with the line of sight of the video transducer; each HUD device is fixed on an HUD support making it possible to sight a line, known as line of sight of the HUD support, which coincides with the line of sight of the HUD device. The method according to the invention is characterized in that:

the field of vision of the video transducer used is at least equal to the meeting of the display fields of the HUD devices, augmented by a margin corresponding to the offsets of the field of vision of the video transducer and of the display fields of the HUD devices, which offsets can be generated by discrepancies of alignment between the lines of sight of the video transducer and HUD devices and a reference direction, known as aircraft line of sight, determined by the structure of the aircraft, the video transducer communicates with each HUD device and vice versa, at least one among the video transducer and the HUD devices receives:

at least one transducer error such as defined in the foregoing and, for each HUD support, at least one HUD error such as defined in the foregoing, and/or, for each HUD support, at least one HUD/transducer error such as defined in the foregoing, for each HUD device, at least one among the video transducer and the said HUD device defines, in real time, an image to be projected on the basis of the display field of the said HUD device and of one or more HUD/transducer errors, in such a way as to alleviate the discrepancies of alignment between the fields of vision and display of the video transducer and HUD device and the scene ahead of the aircraft.

The video transducer and the HUD devices may proceed according to one of the embodiments of the invention described in the foregoing. Advantageously, they proceed as explained for the fourth or the fifth (or possibly the first) embodiment, but only when several HUD devices are projecting a video image. In this case:

each HUD device transmits, in real time, to the video transducer, a datum representative of a "video displayed" state when it projects a video image (when it is not projecting a video image, the HUD device does not transmit any datum to the video transducer or it transmits a datum representative of a "video not displayed" state), when the video transducer receives the datum representative of the "video displayed" state from at least two HUD devices, the video transducer defines and transmits, in real time, to these HUD devices, an image, known as transmitted image, corresponding to a window over the captured image, which window is defined on the one hand by the smallest of the display fields of these HUD devices and on the other hand by an average, for each direction, of the HUD/transducer errors of the corresponding HUD supports around the said direction; the video transducer additionally transmits, in real time, at least to these HUD devices, a datum representative of a "multiple display" mode of functioning;

each of these HUD devices defines, in real time, its image to be projected as being the meeting on the one hand of the intersection between the transmitted image and a window over the captured image, which window is defined by the display field of the said HUD device, and by each HUD/transducer error of the corresponding HUD support, and on the other hand of a dark margin completing this intersection over the entirety of the display field of the said HUD device (fourth embodiment); alternatively, each of these HUD devices defines, in real time, its image to be projected as being the meeting on the one hand of the transmitted image offset as a function, for each direction, of the difference between the average calculated by the video transducer and the HUD/transducer error of the corresponding HUD support, and on the other hand of a dark margin completing the image offset in this way over the entirety of the display field of the said HUD device (fifth embodiment);

none of the other HUD devices (if the set of equipment items contains more than two and only two are in "video displayed" state) either receives or projects any video image;

when the video transducer receives the datum representative of the "video displayed" state only from a single HUD device, the video transducer defines and transmits, in real time, to this HUD device, an image corresponding to a window over the captured image, which window is defined by the display field of this HUD device and by each HUD/transducer error of the corresponding HUD support; the video transducer additionally transmits, in real time, at least to this HUD device, a datum representative of a "single display" mode of functioning; the said HUD device projects, in real time, the image transmitted in this way by the video transducer;

none of the other HUD devices either receives or projects any video image.

BRIEF DESCRIPTION OF THE DRAWINGS

Other details and advantages of the present invention will become apparent upon reading the description hereinafter, which is presented with reference to the attached schematic drawings and relates to preferred embodiments, provided by way of non-limitative examples. In these drawings.

DETAILED DESCRIPTION OF THE INVENTION

Figures 1, 2, 3:
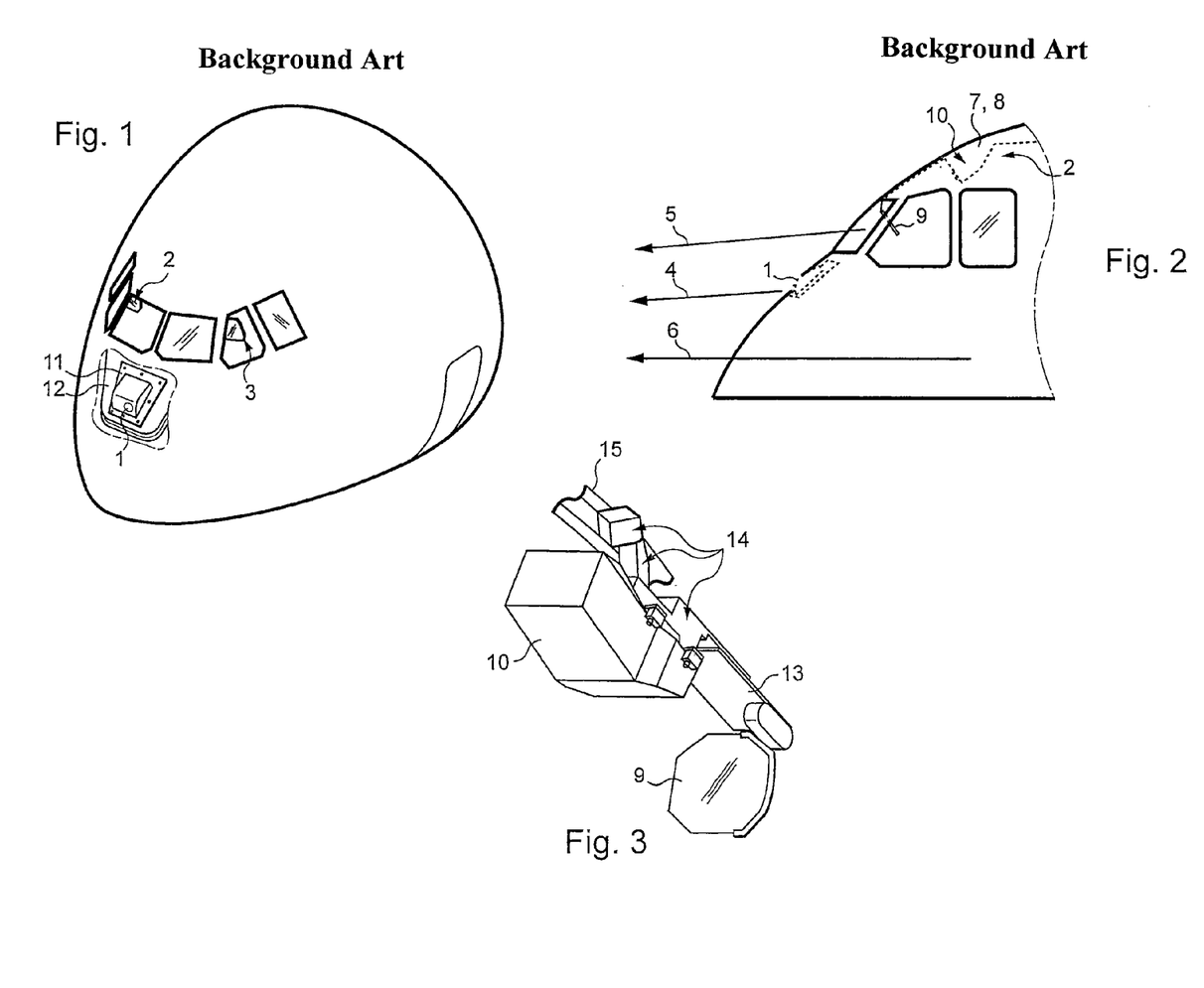
FIG. 1 is a schematic perspective view of the nose cone of an aircraft comprising a set of equipment items according to the invention.
FIG. 2 is a schematic profile view of the nose cone of FIG. 1.
FIG. 3 is a schematic perspective view of a head-up display device.

The aircraft, whose nose cone is represented in FIGS. 1 and 2, integrates a set of equipment items according to the invention, comprising a video transducer 1, such as an infrared video transducer known under the name "Enhanced Vision System", and two head-up display devices 2 and 3, known as HUD devices, one of which is provided for the pilot and the other for the copilot.

In the usual manner, video transducer 1 comprises optical means, which make it possible to capture images of the external scene ahead of the aircraft and which define an optical axis of the video transducer, processing means having one or more microprocessors, and a case for integration and protection of all of these means. Line of sight 4 of the video transducer is its optical axis. This line of sight can be deduced from the case of the video transducer, within the intrinsic error of the said transducer and within measurement errors.

In the usual manner, each HUD device 2 or 3 comprises a computer 8, a projector 7, a screen 9 known as "combiner" and a case 10 integrating in particular projector 7. Screen 9 is composed of a concave transparent glass plate through which the pilot or copilot can see the external scene ahead of the aircraft and on which there are reflected the images projected by projector 7. The image projected in real time by each HUD device results from the superposition of a video image to be projected and a symbology generated by computer 8 of the HUD device. Line of sight 5 of HUD device 2 (or 3) is defined as being the axis passing through the theoretical eye of the pilot (or copilot) and through the trace, on screen 9 of the HUD device, of the center of the display field of the HUD device. This line of sight can be deduced from case 10 (or alternatively from case 10 and screen 9) of the HUD device, within the intrinsic error of the HUD device and within measurement errors.

Since the theoretical axes of vision of the pilot and of the copilot are parallel, they define a single and identical aircraft line of sight, which depends only on the structure of the aircraft and which preferably forms, in a vertical plane, an angle of 1 to 3 degrees (depending on the aircraft model under consideration) with a longitudinal horizontal axis 6 of the aircraft, below latter toward the front of the aircraft. It is to be noted that the terms "vertical" and "horizontal" of an aircraft usually denote the vertical and horizontal such as provided by an inertial system known as GADIRU ("GPS Air Data Inertial Reference Unit", not illustrated) of the aircraft.

For the images projected by HUD devices 2 and 3 to be in conformity with the external scene that can be observed through their respective screens, it is necessary that the lines of sight of video transducer 1 and of HUD devices 2 and 3 be aligned with the aircraft line of sight.

Video transducer 1 is mounted on a support 11, known as transducer support, which is mounted in fixed manner on a platen 12 of the structure of the nose cone of the airplane. This transducer support 11 may be positioned on platen 12 with great precision (for example with the aid of a machine tool and laser sighting). Similarly, the case of video transducer 1 may be positioned with great precision on a mounting plane of transducer support 11, with the aid of centering pins. It is considered that in this way video transducer 1 can be installed on its support with sufficient precision that it can be assumed that the line of sight of video transducer 1, such as provided by its case, can be sighted on the basis of transducer support 11 with negligible error. In other words, transducer support 11 has an intrinsic line of sight considered to be coincident with the line of sight of video transducer 1 such as provided by its case. Consequently, if the errors due to the performance of measurements and the intrinsic error of the video transducer are disregarded at this stage, it can be assumed that the line of sight of transducer support 11 (such as sighted by a high-performance measuring tool) corresponds to the line of sight of video transducer 1.

Because of the complexity of the structure of the airplane, it is impossible to achieve, by mechanical means, perfect positioning of transducer support 11 relative to the aircraft line of sight. A correction is therefore necessary. Of course, the airplane structure and the transducer support are designed such that the discrepancies of positioning of the transducer support (relative to the aircraft line of sight) are preferably as small as possible and in any case smaller than tolerances permitting correction of these discrepancies.

Each HUD device 2, 3 is mounted on a support 14 known as HUD support (see FIG. 3). As explained in the foregoing for transducer support 11, each HUD support 14 can be positioned with great precision relative to an upper structural element 15 of the airplane cockpit. Similarly, case 10 of the HUD device can be positioned with great precision on a mounting plane of HUD support 14, for example with the aid of centering pins. Furthermore, screen 9 can be positioned with great precision relative to case 10, via an arm 13, or relative to a screen support (variant not represented), which itself is mounted with precision on a structural element of the aircraft. It is considered that each HUD device 2, 3 can be installed in this way on its support with sufficient precision that it can be assumed that the line of sight of the said HUD device, such as provided by its case, can be sighted on the basis of corresponding HUD support 14 with negligible error. In other words, each HUD support 14 has an intrinsic line of sight considered to be coincident with the line of sight of the corresponding HUD device 2, 3 such as provided by its case. Consequently, if the errors due to the performance of measurements and the intrinsic error of the HUD devices are disregarded at this stage, it can be assumed that the line of sight of each HUD support 14 (such as sighted by a high-performance measuring tool) corresponds to the line of sight of the corresponding HUD device 2, 3.

Because of the complexity of the structure of the airplane, it is impossible to achieve, by mechanical means, perfect positioning of each HUD support 14 relative to the aircraft line of sight. A correction is therefore necessary. However, the airplane structure and each HUD support 14 are designed such that the discrepancies of positioning of the said support are as small as possible and in any case smaller than tolerances permitting correction of these discrepancies.

In the course of its manufacture, the aircraft is pre-equipped in such a way as to accommodate a set of equipment items according to the invention. In addition to transducer support 11 and HUD support 14, the following elements are installed for this purpose:
  a bidirectional data communication bus extending between transducer support 11 and each of HUD supports 14, with a view to permitting bidirectional data communication between the video transducer and each HUD device,
  storage means comprising at least one non-volatile memory;
  a data communication bus between these memory means and transducer support 11, in order to permit transmission of data (such as the errors defined hereinafter) between the said memory means and the video transducer;
  alternatively, a data communication bus between the memory means and each HUD support 14, in order to permit data transmission between the said means and each HUD device 2, 3. In this case, the memory means preferably comprise a memory module (containing at least one non-volatile memory) on each side of the cockpit, and a data communication bus is provided between each memory module and the HUD support disposed on the same side of the cockpit as the said support.

Furthermore, during the manufacture of the aircraft and before installation if applicable of equipment items according to the invention, the discrepancies of positioning of transducer support 11 and HUD support 14 are evaluated. For this purpose, the following data are determined by measurement:
  a datum known as transversal transducer error, equal to the angular difference measured around the vertical direction of the aircraft between the line of sight of transducer support 11 and a measuring reference line considered as being aligned with the aircraft line of sight,
  an error known as vertical transducer error, equal to the angular difference measured around the transversal direction of the aircraft between the line of sight of transducer support 11 and a measuring reference line, which is normally the same as that used for measurement of the transversal transducer error,
  for each HUD support, a datum known as transversal HUD error, equal to the angular difference around the vertical direction of the aircraft between the line of sight of the said HUD support 14 and a measuring reference line considered as being aligned with the aircraft line of sight,
  for each HUD support, a datum known as vertical HUD error, equal to the angular difference around the transversal direction of the aircraft between the line of sight of the said HUD support 14 and a measuring reference line, which is normally the same as that used for measurement of the transversal HUD error of the said HUD support.

Preferably there is used a single and identical measuring reference line to determine all of the aforesaid errors. This measuring reference line is advantageously the aircraft line of sight such as provided by the GADIRU support. The orientation of the aircraft line of sight relative to the GADIRU support is effectively known. The choice of this support is even more pertinent when the GADIRU also has the function of providing the source data used for constructing symbologies projected by the HUD devices.

Nevertheless, the possibility is not ruled out that a first measuring reference line (aircraft line of sight such as provided by a first reference structural element of the aircraft) is used to perform measurements relative to one of the HUD supports, and that a second measuring reference line (aircraft line of sight such as provided by a second reference structural element of the aircraft) is used to perform measurements relative to the other HUD support. In this case, however, it is advisable to measure two series of transducer errors: a first series defined relative to the first measuring reference line and a second series defined relative to the second measuring reference line, so that the various HUD/transducer errors can then be calculated.

The transducer errors and HUD errors determined in this way by measurement are stored in the aircraft memory mentioned in the foregoing (or in the aircraft memories if the memory means are split into two memory modules). Alternatively, or in combination, the following data for each HUD support are stored in this memory:
  a datum known as transversal HUD/transducer error, equal to the difference between the transversal HUD error of the said HUD support and the transversal transducer error (preferably measured on the basis of the same measuring reference line), and
  a datum known as vertical HUD/transducer error, equal to the difference between the vertical HUD error of the said HUD support and the vertical transducer error (preferably measured on the basis of the same measuring reference line).

The data stored in this way in the aircraft memory are data intrinsic to the aircraft, which are determined by its structure and its transducer and HUD supports. According to the invention, these data are necessary and sufficient for determining the electronic compensation to be applied by the video transducer and/or HUD devices installed at a later time in the aircraft. From this point on, the installation of these equipment items, which are generally offered as options, does not require any supplementary operation of harmonization of equipment items. These items are operational as soon as they are mounted on their respective support.

Once the set of equipment items has been installed in the aircraft, video transducer 1 extracts, from the aircraft memory (provided it is connected thereto), the set of stored errors; as the case may be, it calculates the HUD/transducer errors; furthermore, it is induced, depending on the embodiment, to communicate certain of the extracted or calculated errors to the HUD devices. Alternatively, each HUD device extracts, from the corresponding memory of the aircraft, the transducer errors and HUD errors stored in memory for the HUD support on which it is mounted, and/or the HUD/transducer errors stored for the said HUD support (alternatively, it calculates these errors); furthermore, each HUD device is induced, depending on the embodiment, to communicate certain of these errors to the video transducer or possibly even to the other HUD device.

Figure 4:
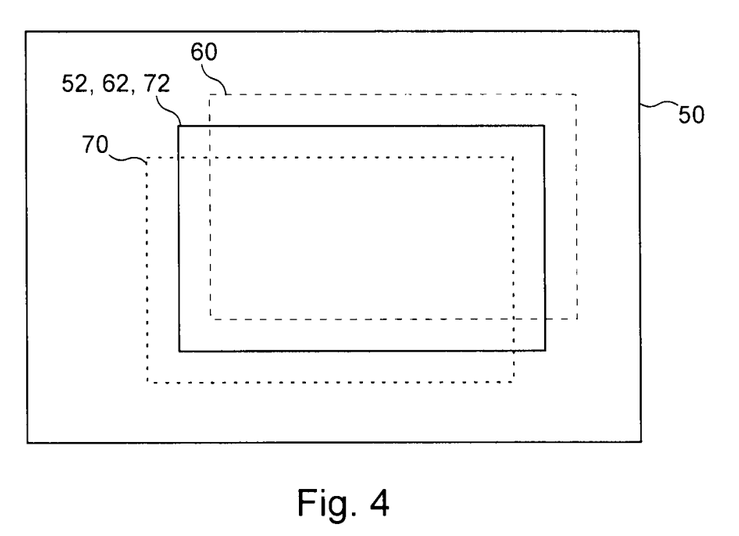
FIG. 4 is a diagram illustrating the images captured and projected by a set of equipment items according to the first embodiment of the invention.

FIG. 4 represents the images captured and projected by a set of elements according to a first embodiment of the invention, installed in the aircraft described in the foregoing. The video transducer of this set has a field of vision permitting it to capture an image 50. In the illustrated example, the two HUD devices of the set are of the same type and in particular have the same display field. HUD device 2 of this set is mounted on the HUD support situated on the pilot's side, while HUD device 3 is mounted on the HUD support situated on the copilot's side.

Reference 60 denotes a window over captured image 50, which window represents the field of vision of HUD device 2 of the pilot: the center of this window is offset transversally and vertically from the center of the captured image: the corresponding transversal offset is equal to the transversal HUD/transducer error stored in memory for the first HUD support (in other words, this transversal offset is substantially equal to the transversal difference between the lines of sight of HUD device 2 and video transducer 1), while the vertical offset is equal to the vertical HUD/transducer error stored in memory for the first HUD support (in other words, this vertical offset is substantially equal to the vertical difference between the lines of sight of HUD device 2 and video transducer 1); furthermore, the vertical and transversal dimensions of window 60 correspond to the display field of HUD device 2. As defined initially, this relates to the operational display field of HUD device 2 (whose size is 1024×768 pixels, for example) and not to its optical display capacity (for example, 1280×1024 pixels). This comment is also applicable to the display field of HUD device 3 alluded to hereinafter.

Window 60 therefore corresponds to the image that HUD device 2 should project to obtain excellent conformity with the external scene (within the measurement errors involved in the definition of the HUD/transducer errors and within the intrinsic errors of HUD device 2 and video transducer 1).

Analogously, reference 70 denotes a window over captured image 50, which window represents the field of vision of HUD device 3 of the copilot: the center of this window 70 is offset transversally from the center of the captured image by a distance equal to the transversal HUD/transducer error stored in memory for the second HUD support; the center of window 70 is offset vertically from the center of the captured image by a distance equal to the vertical HUD/transducer error stored in memory for the second HUD support; furthermore, the vertical and transversal dimensions of window 70 correspond to the display field of HUD device 3. Window 70 therefore corresponds to the image that HUD device 3 should project to obtain excellent conformity with the external scene (within the measurement errors involved in the definition of the HUD/transducer errors and within the intrinsic errors of HUD device 3 and video transducer 1).

It will be noted that the offset between windows 60 and 70 illustrated in all of the attached figures has been intentionally exaggerated for the sake of clarity. In reality, this offset is very small.

In a first version of the first embodiment of the invention, the video transducer calculates the averages of the HUD/transducer errors of the two transducer supports to define a third window 52: the center of this window 52 is offset transversally from the center of captured image 50 by a distance equal to an average of the transversal HUD/transducer errors of the two HUD supports; preferably this distance is equal to the arithmetic average (sum divided by two) of the transversal HUD/transducer errors; the center of window 52 is offset vertically from the center of captured image 50 by a distance equal to an average (preferably the arithmetic average) of the vertical HUD/transducer errors of the two HUD supports; furthermore, the vertical and transversal dimensions of window 52 correspond to the smallest of the display fields of devices 2 and 3 (in the example, the two devices have the same display field). Video transducer 1 extracts, in real time, the image corresponding to window 52 calculated in this way, and transmits it to the two HUD devices 2, 3. Each HUD device 2, 3 displays, in real time, the image received in this way.

Alternatively, in a second version of the first embodiment of the invention, the HUD devices exchange the HUD/transducer errors of their respective HUD support in order to calculate window 52 themselves. The video transducer transmits, in real time, to the two HUD devices, the entirety of captured image 50, and each HUD device extracts, in real time, from the received image, the image corresponding to window 52 calculated in the foregoing. Taking the size of the image transmitted by the video transducer into account, this second version nevertheless requires that a video capacity higher than that necessary in the first version must be provided for equal resolution. In addition, the resources in terms of video transducer processors are greater, since all of the image-processing operations usually provided (gain, improvement, etc.) are applied to a larger image. Conversely, the first version can be employed with the aid of a standard existing video transducer.

In this first embodiment, regardless of the version chosen, images 62 and 72 to be projected by HUD devices 2 and 3 therefore both correspond to the image of window 52. Theoretically, therefore, the compensation applied does not cancel out the discrepancies of alignment. But when these discrepancies are small, this first embodiment yields acceptable results, albeit provided, in certain cases, the transducer errors and HUD errors have been measured on the basis of a common reference element. In addition, this first embodiment presents the advantage of limiting the processing capacity necessary for its execution: it uses only a single algorithm for the correction calculation, which algorithm is resident either in the transducer or in the two HUD devices; a single equipment item of each HUD-transducer combination is involved in modification of the image.

Figure 5:
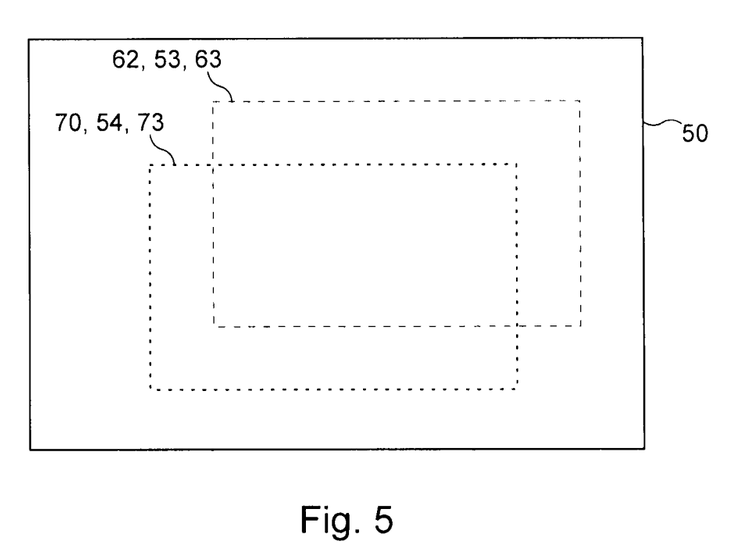
FIG. 5 is a diagram illustrating the images captured and projected by a set of equipment items according to the second and third embodiments of the invention.

FIG. 5 illustrates a second embodiment of the invention. In this second embodiment, video transducer 1 calculates windows 60 and 70 defined in the foregoing on the basis of HUD/transducer errors. It then transmits, in real time, to HUD device 2, image 53 corresponding to window 60 and, to HUD device 3, image 54 corresponding to window 70. Each HUD device projects the image received in this way. This embodiment has the advantage of optimizing the compensation achieved for each HUD device. In addition, it requires only a single algorithm for the correction calculation, which algorithm is resident in the video transducer, since the HUD devices do not modify the images that they receive. If two series of measurements are performed with the video transducer (one with the reference element used for HUD device 2 and the other with the reference element used for HUD device 3) in order to define transducer errors and HUD errors with the same measuring reference line, the residual discrepancies of conformity are limited to only the intrinsic errors of the equipment items and of the measuring tools. On the other hand, this embodiment requires the use of a video transducer having two separate video circuits.

Alternatively, in a third embodiment of the invention, video transducer 1 transmits, in real time, to the two HUD devices 2, 3, the entirety of captured image 50. Each HUD device 2, 3 itself calculates the window corresponding to its field of vision and extracts, in real time, the corresponding image of the received image. In this way HUD device 2 calculates window 60 on the basis of its display field and of the HUD/transducer errors of its HUD support and projects the resultant image 63. HUD device 3 calculates window 70 on the basis of its display field and of the HUD/transducer errors of its HUD support and projects the resultant image 73 (see FIG. 5). In common with the second embodiment, the compensation is optimized and the residual discrepancies of conformity can be limited to only the intrinsic errors of the equipment items and of the measuring tools. Nevertheless, taking the size of the processed and transmitted image into account, this embodiment necessitates the use of a high-performance video transducer and of high-capacity video channels.

Figure 6:
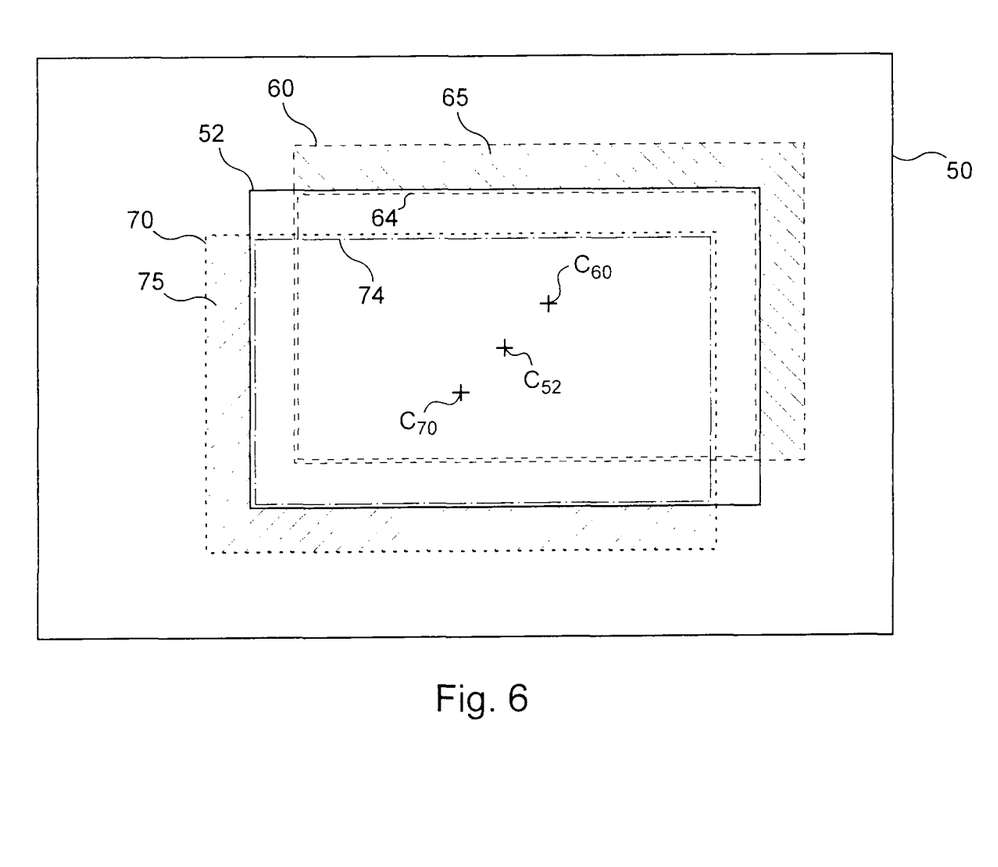
FIG. 6 is a diagram illustrating the images captured and projected by a set of equipment items according to the fourth or the fifth embodiment of the invention

FIG. 6 illustrates a fourth and a fifth embodiment of the invention. In these two embodiments, video transducer 1 calculates window 52 such as defined in the first embodiment on the basis of averages of the HUD/transducer errors: the center $C_{52}$ of this window 52 is offset transversally from the center of window 50 by a distance—known as transversal average—equal to the sum of the transversal HUD/transducer errors of the first and second HUD supports divided by two; the center $C_{52}$ of window 55 is offset vertically from the center of window 50 by a distance—known as vertical average—equal to the sum of the vertical HUD/transducer errors of the first and second HUD supports divided by two; the dimensions of this window 52 are given by the display field of the HUD devices. In other words, video transducer 1 applies a first correction (vertical and transversal). Video transducer 1 transmits, in real time, to the two HUD devices 2, 3, the image corresponding to window 52, together with the vertical and transversal averages calculated in the foregoing. Each HUD device 2, 3 calculates on the one hand the difference, known as vertical difference, between the vertical average and the vertical HUD/transducer error of its transducer support, and on the other hand the difference, known as transversal difference, between the transversal average and the transversal HUD/transducer error of its transducer support.

In the fourth embodiment of the invention, the vertical and transversal differences calculated by each HUD device make it possible for this to define, in real time, the intersection between the image transmitted by the video transducer and its own field of vision. In this way HUD device 2 determines a window 64 (see FIG. 6) over the received image and extracts, in real time, the corresponding image therefrom, while HUD device 3 determines a window 74 over the received image and extracts the corresponding image therefrom in real time. Each HUD device 2, 3 then constructs, in real time, an image to be projected by completing, over the entirety of its display field, the image extracted in this way by a margin 65, 75 formed of black pixels (dark pixels). Each HUD device projects, in real time, the image constructed in this way.

In the fifth embodiment of the invention, the vertical and transversal differences calculated by each HUD device 2, 3 are used as follows. Each HUD device 2, 3 constructs an image to be projected, firstly by offsetting the received image (relative to the center $C_{60}$, $C_{70}$ of its display field, which has been overlaid on captured image 50 for purposes of illustration): the vertical offset applied is equal to the vertical difference calculated in the foregoing, while the transversal offset applied is equal to the transversal difference calculated in the foregoing. The image offset in this way is then completed, over the entirety of its display field, by a margin 65, 75 formed of black pixels (dark pixels). Each HUD device projects, in real time, the image constructed in this way.

In common with the second and third embodiments, the compensation applied in the fourth and fifth embodiments is optimized, and it yields very satisfactory results, including when the measurements are not performed with a reference line common to the two HUD supports. Nevertheless, if the materialization of such a line can be envisioned (despite the additional labor cost and time involved), the residual discrepancies of conformity will be limited to the intrinsic errors of the equipment items and of the measuring tools. A standard video transducer with limited resources in terms of processors and having only a single video circuit as well as video channels of standard capacity can be used, since the video transducer processes and transmits only an image of reduced size. On the other hand, a loss of field is observed due to the final window size applied by the HUD devices. This loss is nevertheless minimized by the averaging operation applied in the video transducer. The inventors have observed that this loss of field does not exceed 2 to 3 lines at the field border (or approximately 0.7% of the image), and so it has no impact from the operational viewpoint.

In addition, it can be provided that the compensation applied according to the fourth or fifth embodiment of the invention is employed only when the two devices project a video image concomitantly. During the operational phases in which the video image is displayed only by a single HUD device, it may be provided that the video transducer applies complete compensation and therefore furnishes the HUD device in question with an image in conformity with its field of vision. For example, when only HUD device 2 displays a video image, the transducer extracts and transmits, in real time, to the said HUD device, the image corresponding to window 60, which image is directly and integrally projected by the HUD device, without any additional processing and without any loss of field. In this case, it is necessary on the one hand that each HUD device transmit, in real time, to the video transducer, a datum representative of a current state "video displayed" (or, on the contrary, "video not displayed") of the said HUD device. It is also necessary on the other hand that the video transducer communicate, to the HUD devices, a datum representative of the mode of functioning in progress ("multiple display" or "single display"), in order that each HUD device knows which type of image to construct and display. Alternatively, the video transducer may transmit, to the HUD devices, the values of the vertical and transversal corrections that it has applied (average of the errors or total error), and each HUD device may verify whether or not this correction corresponds respectively to the vertical and transversal HUD/transducer errors of its support, in order to deduce therefrom the mode of functioning in progress.

Figure 7:
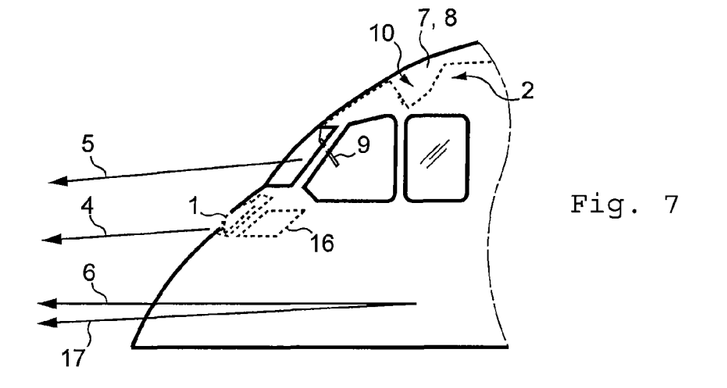
FIG. 7 is a schematic profile view of the nose cone of an aircraft.
Figure 8:
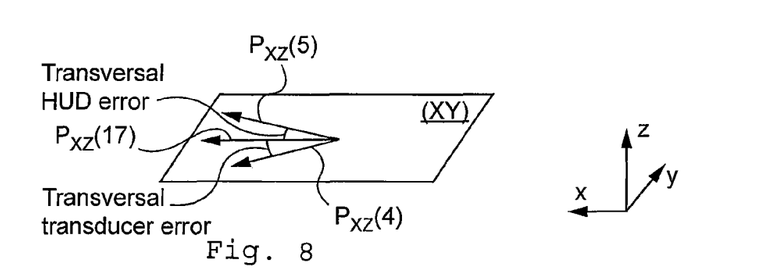
FIG. 8 is a diagram illustrating angular errors of the invention.

FIG. 7 is a profile view of the nose cone of an aircraft, the aircraft including a memory 16 in which each transducer error and each HUD error or each HUD/transducer error is stored.

Figure 9:
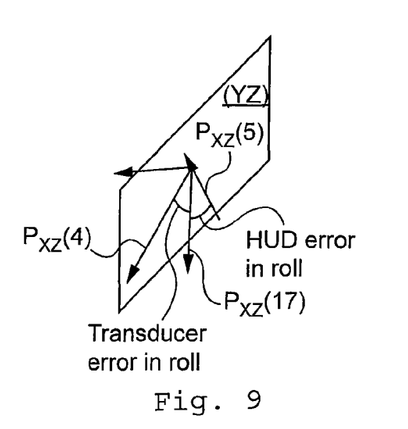
FIG. 9 is a diagram illustrating angular errors of the invention.
Figure 10:
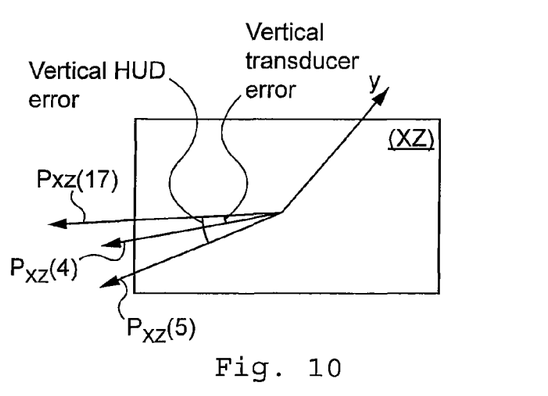
FIG. 10 is a diagram illustrating angular errors of the invention.

FIG. 7 also shows the aircraft line of sight 17. Lastly, FIGS. 9-10 show angular errors of the invention. The invention may be the object of numerous variants relative to the illustrated embodiment, provided such variants fall within the scope defined by the claims.

The invention claimed is:

1. A set of equipment items for an aircraft comprising:
a video transducer and at least two head-up display (HUD) devices, the video transducer having a line of sight and a field of vision defining a video image captured by the video transducer, each HUD device having a line of sight and a display field defining an image projected by the HUD device, the video transducer is fixed on a transducer support, in a position so that the transducer support makes a line of sight of the transducer support, which, when the video transducer is fixed on the transducer support, coincides with the line of sight of the video transducer, each HUD device is fixed on a HUD support, in a position so that the HUD support makes a line of sight of the HUD support, which, when a HUD device is fixed on the HUD support, coincides with the line of sight of the HUD device, wherein:
the field of vision of the video transducer is at least equal to a union of the display fields of the HUD devices, augmented by a margin corresponding to offsets of the field of vision of the video transducer and of the display fields of the HUD devices, the offsets are generated when the set of equipment items are mounted in the aircraft, as a result of discrepancies of alignment between the lines of sight of the video transducer and HUD devices and a reference direction, which is the aircraft line of sight, determined by the structure of the aircraft,
the video transducer is designed such that it can communicate with each HUD device and vice versa,
at least one of the equipment items is configured to receive:
at least one transducer error datum equal to an angular difference around a direction between the line of sight of the transducer support and a measuring reference line, and for each HUD support, at least one HUD error datum equal to an angular difference around a direction between the line of sight of the HUD support and a measuring reference line, or
for each HUD support, at least one HUD/transducer error datum equal to the difference between the HUD error of the HUD support around a given direction and the transducer error around the given direction, and
for each HUD device, at least one among the video transducer and the HUD device is configured to define an image to be projected on the basis of the display field of the HUD device and of one or more HUD/transducer errors, to alleviate discrepancies of alignment between the lines of sight of the video transducer and the HUD device and the aircraft line of sight.

2. The set of equipment items according to claim 1, wherein at least one of the equipment items is configured to receive:
at least:
a transversal transducer error, equal to an angular difference around a vertical direction of the aircraft between the line of sight of the transducer support and a measuring reference line aligned with the aircraft line of sight, and a vertical transducer error, equal to an angular difference around a transversal direction of the aircraft between the line of sight of the transducer support and a measuring reference line aligned with the aircraft line of sight, and for each HUD support, a transversal HUD error, equal to an angular difference around the vertical direction of the aircraft between the line of sight of the HUD support and a measuring reference line aligned with the aircraft line of sight, and a vertical HUD error, equal to an angular difference around a transversal direction of the aircraft between the line of sight of the HUD support and a measuring reference line aligned with the aircraft line of sight, or at least, for each HUD support, a transversal HUD/transducer error and a vertical HUD/transducer error.

3. The set of equipment items according to claim 2, wherein at least one of the equipment items is configured to receive:
a transducer error in roll, equal to an angular difference around a longitudinal direction of the aircraft between a line orthogonal to the line of sight of the transducer support and a measuring reference line orthogonal to the aircraft line of sight, and
for each HUD support, a HUD error in roll, equal to an angular difference around the longitudinal direction of the aircraft between a line orthogonal to the line of sight of the HUD support and a measuring reference line orthogonal to the aircraft line of sight.

4. The set of equipment items according to claim 1, wherein for each HUD device, the image to be projected corresponds to a window over the captured image, the window is defined by a smallest of the display fields of the HUD devices and by an average, for each direction, of the HUD/transducer errors of the HUD supports around the direction.

5. The set of equipment items according claim 1, wherein, for each HUD device, the image to be projected corresponds to a window over the captured image defined by the display field of the HUD device and by each HUD/transducer error of the corresponding HUD support.

6. The set of equipment items according to claim 5, wherein the video transducer possesses two video circuits, and the video transducer is configured, for each HUD device, to define and transmit, to the HUD device, the image to be projected.

7. The set of equipment items according to claim 5, wherein the video transducer and each HUD device are respectively configured to transmit and receive the image captured by the video transducer, and each HUD device is configured to define its image to be projected.

8. The set of equipment items according to claim 1, wherein:
the video transducer is configured to define a transmitted image, corresponding to a window over the captured image, the window is defined by a smallest of the display fields of the HUD devices and by an average, for each direction, of the HUD/transducer errors of the HUD supports around the direction, and
each HUD device is configured to define its image to be projected as a union of the intersection between the transmitted image and a window over the captured image, the window is defined by the display field of the HUD device and by each HUD/transducer error of the corresponding HUD support, and of a dark margin completing this intersection over the entirety of the display field of the HUD device.

9. The set of equipment items according to claim 1, wherein:
the video transducer is configured to define a transmitted image, corresponding to a window over the captured image, the window is defined by a smallest of the display fields of the HUD devices and by an average, for each direction, of the HUD/transducer errors of the HUD supports around the direction, and each HUD device is configured to define its image to be projected as a union of the transmitted image offset as a function, for each direction, of the difference between the average calculated by the video transducer and the HUD/transducer error of the corresponding HUD support, and of a dark margin completing the image offset in this way over the entirety of the display field of the HUD device.

10. The set of equipment items according to claim 4, wherein each HUD device is configured to generate and transmit, to the video transducer, a datum representative of a "video displayed" state when it projects a video image.

11. An aircraft, comprising a set of equipment items according to claim 1, a transducer support, HUD supports and at least one memory in which each transducer error and each HUD error or each HUD/transducer error are stored.

12. A method for electronic compensation between a video transducer and at least two head-up display (HUD) devices of an aircraft, to alleviate, for each HUD device, a discrepancy of conformity between an external scene ahead of the aircraft and an image formed on the basis of a video image captured by the video transducer and projected by the HUD device, the video transducer having a line of sight and a field of vision defining the video image captured by the video transducer, each HUD device having a line of sight and a display field defining the image projected by the HUD device, the video transducer is fixed on a transducer support so that a line of sight of the transducer support coincides with the line of sight of the video transducer; each HUD device being fixed on a HUD support, so that a line of sight of the HUD support coincides with the line of sight of the HUD device, wherein the field of vision of the video transducer used is at least equal to a union of the display fields of the HUD devices, augmented by a margin corresponding to offsets of the field of vision of the video transducer and of the display fields of the HUD devices, the offsets can be generated by discrepancies of alignment between the lines of sight of the video transducer and HUD devices and a reference direction, known as aircraft line of sight, determined by the structure of the aircraft, the video transducer communicates with each HUD device and vice versa, and at least one among the video transducer and the HUD devices receives:
  at least one transducer error datum equal to the angular difference around a direction between the line of sight of the transducer support and a measuring reference line, and for each HUD support, at least one HUD error datum equal to the angular difference around a direction between the line of sight of the HUD support and a measuring reference line, or for each HUD support, at least one HUD/transducer error datum, equal to the difference between the HUD error of the HUD support around a direction and the transducer error around this same direction, and for each HUD device, at least one among the video transducer and the HUD device defines, in real time, an image to be projected on the basis of the display field of the HUD device and of one or more HUD/transducer errors, to alleviate the discrepancies of alignment between the lines of sight of the video transducer and HUD device and the aircraft line of sight.

13. A method according to claim 12, wherein:
each HUD device transmits, in real time, to the video transducer, a datum representative of a "video displayed" state when it projects a video image, when the video transducer receives the datum representative of the "video displayed" state from at least two HUD devices,
  the video transducer defines and transmits, in real time, to the at least two HUD devices an image, corresponding to a window over the captured image, the window is defined by the smallest of the display fields of these HUD devices and by an average, for each direction, of the HUD/transducer errors of the corresponding HUD supports around the direction; the video transducer additionally transmits, in real time, at least to these HUD devices, a datum representative of a "multiple display" mode of functioning;
  each of these HUD devices defines, in real time, its image to be projected as being a union of the intersection between the transmitted image by the video transducer and a window over the captured image, the window is defined by the display field of the HUD device, and by each HUD/transducer error of the corresponding HUD support, and of a dark margin completing the intersection over the entirety of the display field of the HUD device;

when the video transducer receives the datum representative of the "video displayed" state only from a single HUD device,
  the video transducer defines and transmits, in real time, to the single HUD device, an image corresponding to a window over the captured image, the window is defined by the display field of this HUD device and by each HUD/transducer error of the corresponding HUD support; the video transducer additionally transmits, in real time, to at least the single HUD device, a datum representative of a "single display" mode of functioning;
  the single HUD device projects, in real time, the image transmitted by the video transducer, and
  none of the other HUD devices either receives or projects any video image.

14. The method according to claim 12, wherein:
each HUD device transmits, in real time, to the video transducer, a datum representative of a "video displayed" state when it projects a video image, when the video transducer receives the datum representative of the "video displayed" state from at least two HUD devices,
  the video transducer defines and transmits, in real time, to these HUD devices, an image, corresponding to a window over the captured image, the window is defined by the smallest of the display fields of these HUD devices and by an average, for each direction, of the HUD/transducer errors of the corresponding HUD supports around the direction; the video transducer additionally transmits, in real time, to at least these HUD devices, a datum representative of a "multiple display" mode of functioning;
  each of these HUD devices defines, in real time, its image to be projected as a union of the transmitted image offset as a function, for each direction, of the difference between the average calculated by the video transducer and the HUD/transducer error of the corresponding HUD support, and of a dark margin completing the image offset in this way over the entirety of the display field of the HUD device;

when the video transducer receives the datum representative of the "video displayed" state only from a single HUD device,
the video transducer defines and transmits, in real time, to the single HUD device, an image corresponding to a window over the captured image, the window is defined by the display field of the single HUD device and by each HUD/transducer error of the corresponding HUD support; the video transducer additionally transmits, in real time, at least to the single HUD device, a datum representative of a "single display" mode of functioning;
the single HUD device projects, in real time, the image transmitted in this way by the video transducer,
none of the other HUD devices either receives or projects any video image.

* * * * *